United States Patent Office 3,450,779
Patented June 17, 1969

3,450,779
PROCESS FOR PREPARATION OF CHLOROTRIFLUOROMETHANE
Louis Foulletier, Lyon, France, assignor to Ugine Kuhlmann, Paris, France, a corporation of France
No Drawing. Filed Nov. 30, 1965, Ser. No. 510,667
Claims priority, application France, Dec. 8, 1964, 997,786
Int. Cl. C07c 17/10
U.S. Cl. 260—653                                    1 Claim

ABSTRACT OF THE DISCLOSURE

A process for the production of chlorotrifluoromethane substantially free from trifluoromethane; the reaction essentially comprises reacting chlorine and trifluoromethane in a respective ratio of 1:0.95 and 1:1.05 at a temperature between 600 and 700° C.

---

This invention relates to a process for preparation of chlorotrifluoromethane.

Chlorotrifluoromethane, which is a low temperature refrigerant for the temperatures around —80° C., is a usual by-product resulting from the reaction of carbon tetrachloride with hydrofluoric acid in the preparation of dichlorodifluoromethane and trichlorofluoromethane. However, the use of this reaction to prepare chlorotrifluoromethane itself is not very interesting industrially because the percentage of chlorotrifluoromethane formed is substantially lower than that of the two other chlorofluoromethanes, and the separation, as well as the purification, of such small amounts is very costly. Furthermore, increasing the percentage of chlorotrifluoromethane requries production of a gaseous mixture richer in dichlorodifluoromethane and poorer in trichlorofluoromethane, which also presents serious disadvantages.

I have found it possible to prepare chlorotrifluoromethane of high purity in a simple manner by chlorination of trifluoromethane which is often an abundant by-product of little value from the production of chlorodifluoromethane, $CHClF_2$. The invention relates to a process for the preparation of chlorotrifluoromethane by thermal chlorination of $CF_3H$ between substantially 400 and 800° C.

The preferential temperature range is between 500 and 700° C., wherein the reaction is sufficiently rapid and the formation of by-products very small or null.

The reaction is performed with molar ratios of $Cl_2:CF_3H$ which vary within as wide limits as 1:10 to 10:1. It has been found possible to obtain practically quantitative yields in chlorotrifluoromethane without necessarily using an excess of chlorine; thus, a further operation of separating this element is avoided. The preferred molar ratios range between 1:0.95 and 1:1.05.

The result of the reaction between chlorine and trifluoromethane is surprising and is different from what is observed in the reaction of bromine on trifluoromethane wherein the reaction is balanced and in all cases gives a mixture of bromotrifluoromethane and trifluoromethane. By comparison, in the case of chlorination, and providing chlorine in a sufficient amount, it is possible to obtain a chlorotrifluoromethane free from trifluoromethane. This is particularly interesting because it is rather difficult to separate $CF_3H$ and $CF_3Cl$ by distillation since their boiling points are respectively —82° C. and —81° C. under atmospheric pressure.

In the preparation of chlortrifluoromethane acording to the invention, the mixture of trifluoromethane and chlorine is introduced into an appropriate reactor, made of chlorine resistant materials—such as quartz, alumina, nickel, etc. and may be tube-shaped. The reactor is brought to the reaction temperature, 400 to 800° C. by heating in a furnace. The reaction gases are washed with water in a washing column to remove the hydrochloric acid and eventually the traces of hydrofluoric acid which they contain. Then, they are dried up by any known means such as washing with sulphuric acid, passage through a desiccant such as calcium chloride, or through an adsorbent (silica or alumina gel, or a molecular sieve). Lastly, the dry gases are compressed and liquefied by cooling. Eventually, it is possible to purify them by distillation to remove the traces of dichlorodifluoromethane which are formed sometimes as a by-product from the reaction.

The reactor productivity may be increased by preheating the trichloromethane to not over 800° C. in a superheater, the preferred temperature varying between 600 and 700° C. Since trifluoromethane starts to decompose only at a high temperature, and its specific molar heat is definitely higher than that of chlorine, it is possible, in a very simple manner, to bring the gases to the reaction temperature.

The following non-limitative examples illustrate the process of the invention.

Example 1

Into a cylindrical quartz reactor, 25 mm. in inner diameter and 800 mm. in length, were introduced, chlorine at the rate of 3.130 moles/hour, and trifluoromethane at the rate of 3.100 moles/hour.

The reactor was heated along 500 mm. of its length in a furnace wherein temperature was maintained at 640° C. The temperature inside the reactor was not uniform and reached a maximum of 684° C. After washing and drying the reaction gases, 3.050 moles/hour of chlorotrifluoromethane gas was formed which contained only 1.33% dichlorodifluoromethane and less than 200 p.p.m. of trifluoromethane were collected.

Example 2

The operation was carried out under the same experimental conditions as in Example 1, but the furnace was maintained at 525° C. instead of 640° C. The maximum temperature in the quartz tube was down to 593° C. and a gas containing 1.41% trifluoromethane was obtained.

It can be seen that, all things being equal, lowering the furnace temperature resulted in an important increase in the amount of un-transformed trifluoromethane.

Example 3

Into the same apparatus as in Example 1 and 2 were introduced 1.520 mole/hour of chlorine and 1.505 mole/hour of trifluoromethane. The furnace temperature was maintained at 600° C. Chlorotrifluoromethane containing only 1.21% dichlorodifluoromethane and less than 500 p.p.m. of trifluoromethane was obtained. The yield was 98%.

An increase in the contact time allowed a decrease in the reaction temperature while obtaining a high degree of purity in the chlorotrifluoromethane produced.

Example 4

Into a quartz tube, 160 mm. in interior diameter and 2 m. in length, heated along a length of 1.64 m., were introduced trifluoromethane at the rate of 21 kg./hour, and chlorine at the rate of 21.600 kg./hour. The furnace was formed from two elements. The element near the gas inlet was maintained at 670° C. and the element near the outlet at 600° C. The obtained chlorotrifluoromethane contained only 1.1% dichlorodifluoromethane and less than 200 p.p.m. of trifluoromethane. The yield was 97%.

While I have described preferred embodiments of my invention, it may be otherwise embodied with in the scope of the appended claims.

I claim:

1. A method for production of chlorotrifluoromethane free from trifluoromethane comprising reacting chlorine and trifluoromethane respectively in a molar ratio between 1:0.95 and 1:1.05 at a furnace temperature between 600 and 670° C.

References Cited
UNITED STATES PATENTS 2,658,928   11/1953   Simons et al. _____ 260—653.8

DANIEL D. HORWITZ, *Primary Examiner.*